US006926226B2

(12) United States Patent
Gathier

(10) Patent No.: US 6,926,226 B2
(45) Date of Patent: Aug. 9, 2005

(54) COMPOSITE COMBINATION FOR LAUNCHING A PAYLOAD INTO SPACE

(75) Inventor: Laurent Claude Jean-Louis Gathier, Salon de Provence (FR)

(73) Assignee: Dassualt Aviation, Paris (FR)

( * ) Notice: Subject to any disclaimer, the term of this patent is extended or adjusted under 35 U.S.C. 154(b) by 0 days.

(21) Appl. No.: 10/443,791

(22) Filed: May 23, 2003

(65) Prior Publication Data

US 2003/0218101 A1 Nov. 27, 2003

(30) Foreign Application Priority Data

May 24, 2002 (FR) ............................................. 02 06372

(51) Int. Cl.⁷ ................................................. B64D 5/00
(52) U.S. Cl. ........................................................ 244/2
(58) Field of Search ................................ 244/2, 158 R, 244/162, 62

(56) References Cited

U.S. PATENT DOCUMENTS

| | | | | | |
|---|---|---|---|---|---|
| 1,925,768 | A | * | 9/1933 | Hobart | 244/2 |
| 2,364,803 | A | * | 12/1944 | Mayhew | 244/2 |
| 2,883,125 | A | * | 4/1959 | Straayer | 244/2 |
| 3,516,624 | A | * | 6/1970 | Crook | 244/2 |
| 3,981,467 | A | * | 9/1976 | Ludlow | 244/158 R |
| 4,901,949 | A | | 2/1990 | Elias | 244/49 |
| 5,295,642 | A | | 3/1994 | Palmer | 244/2 |
| 5,456,424 | A | | 10/1995 | Palmer | 244/2 |
| 5,465,923 | A | * | 11/1995 | Milner | 244/2 |
| 5,564,648 | A | | 10/1996 | Palmer | 244/2 |
| 5,740,985 | A | | 4/1998 | Scott et al. | 244/2 |
| 6,119,985 | A | | 9/2000 | Clapp et al. | 244/172 |

FOREIGN PATENT DOCUMENTS

| | | | | |
|---|---|---|---|---|
| DE | 891658 | * | 8/1953 | 244/2 |
| DE | 37 40 645 | | 6/1989 | |
| DE | 39 21 520 | | 7/1990 | |
| EP | 1 207 103 | | 5/2002 | |
| FR | 1.002.315 | | 10/1951 | |
| GB | 430071 | | 6/1935 | |
| IT | 407408 | * | 10/1944 | 244/2 |
| WO | 96/15941 | | 5/1996 | |
| WO | 98/30449 | | 7/1998 | |
| WO | 01/08975 | | 2/2001 | |
| WO | 01/089794 | | 2/2001 | |

OTHER PUBLICATIONS

"The Vehra Demostrator," *News from Provence*, 44: 24 (May 1999).

* cited by examiner

*Primary Examiner*—Tien Dinh
(74) *Attorney, Agent, or Firm*—Jacobson Holman PLLC

(57) ABSTRACT

A composite combination for launching a payload into space including a hypersonic spacecraft carrying the payload and a carrier aircraft, the spacecraft design to take off from the ground on the aircraft and then, upon separation from the carrier aircraft, to propel the payload on its own toward an assigned trajectory. The combination further includes a separation mechanism for separating the vehicle from the aircraft, and measuring elements for measuring physical data operative in the evaluation of the safety of a phase of separation of the vehicle and the aircraft, which data is evaluated by a computer component to authorize a prohibit activation of the separation mechanism.

16 Claims, 2 Drawing Sheets

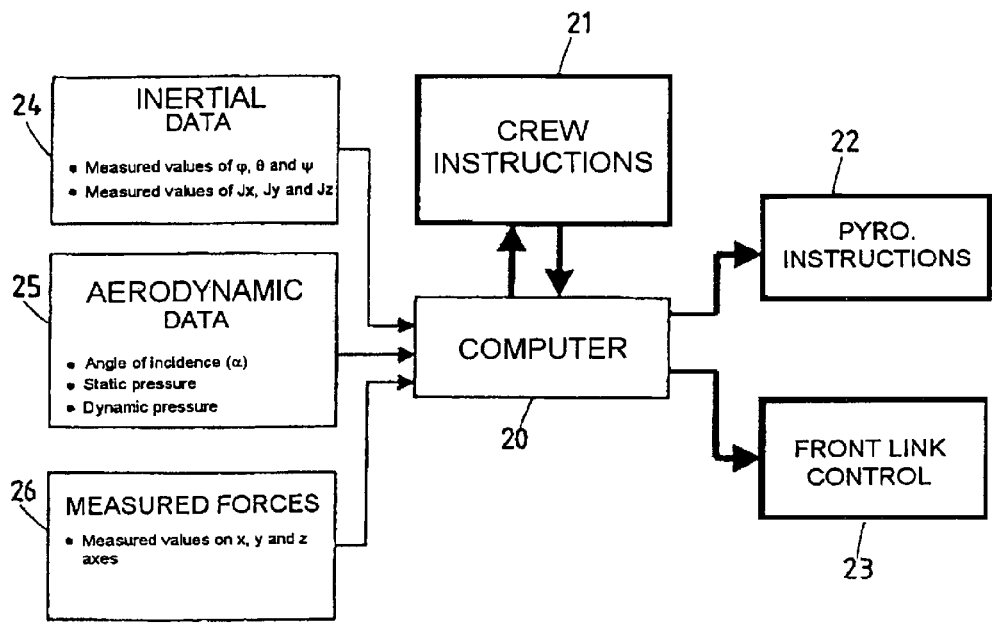
FIG.:4

COMPOSITE COMBINATION FOR LAUNCHING A PAYLOAD INTO SPACE

BACKGROUND OF THE INVENTION

1. Field of the Invention

The present invention relates to a composite combination for launching a payload into space, comprising a hypersonic spacecraft carrying said payload and designed to take off from the ground on an aircraft and then to propel said payload on its own toward an assigned trajectory, said combination comprising means for separating said vehicle from said aircraft.

2. Description of the Prior Art

A combination of the above kind is described in the article "The VEHRA demonstrator" published in May 1999, in issue number 44 of the journal "News from Prospace", published by the French company PROSPACE.

The combination is based on the VEHRA spacecraft designed by the applicant to reduce the cost of placing a satellite in low Earth orbit, VEHRA standing for "véhicule hypersonique réutilisable aéroporté" ("air-launched reusable hypersonic vehicle").

The vehicle is designed to be mounted on the back of a large aircraft, for example an Airbus A300, which transports it to an altitude of around 10 km at which the vehicle separates from the aircraft and follows a specific suborbital trajectory under the thrust of its own engine. The vehicle reaches an altitude of 100/120 km at a speed from Mach 8 to Mach 12. After the engine is extinguished, a payload exits a compartment of the vehicle to be installed in a predetermined orbit.

The vehicle reenters the atmosphere in hypersonic flight and lands for subsequent reuse in other missions. In this way it is possible to launch economically a small satellite, for example weighing 250 kg, possibly equipped with a consumable stage, into a low earth orbit (at an altitude from 100 to 200 km, for example).

Clearly a particularly difficult stage of the flight as described above is that during which the vehicle and the aircraft separate from each other. The trajectories that each must then follow, after separation, must obviously be followed rigorously, in particular to prevent a collision between the vehicle and the aircraft.

It is specifically an object of the invention to ensure separation of the vehicle and the aircraft under optimum safety conditions.

SUMMARY OF THE INVENTION

The above object of the invention, and others that will appear on reading the following description, are achieved by a combination of the type described in the preamble to this description which is noteworthy in that it includes means for measuring physical data operative in the evaluation of the safety of a phase of separation of the vehicle and the aircraft and means for evaluating the safety of said phase to authorize or prohibit activation of the separation means.

According to other features of the combination according to the invention:

said measuring means deliver measured inertial and aerodynamic data associated with the behavior of the composite combination, the combination includes a structure for supporting the vehicle on the back of the aircraft, said measuring means also delivering measured values of forces applied to said support structure, said support structure includes means for adjusting the angle of incidence of the vehicle, said adjustment means comprise a pair of variable length links forming part of said support structure and disposed between said vehicle and said aircraft forward of the center of mass of the vehicle to cause said vehicle to tilt about an axis perpendicular to its longitudinal plane of symmetry and situated in a transverse plane close to its center of mass, said support structure includes means for maintaining said links in a plane transverse to said aircraft regardless of the angle of incidence of said vehicle.

BRIEF DESCRIPTION OF THE DRAWINGS

Other features and advantages of the present invention will become apparent on reading the following description and examining the accompanying drawings, in which:

FIG. 4 is a flowchart showing the cooperation of measuring means, operating safety evaluation means, and control means forming part of the combination according to the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE EMBODIMENTS

Figure 1:
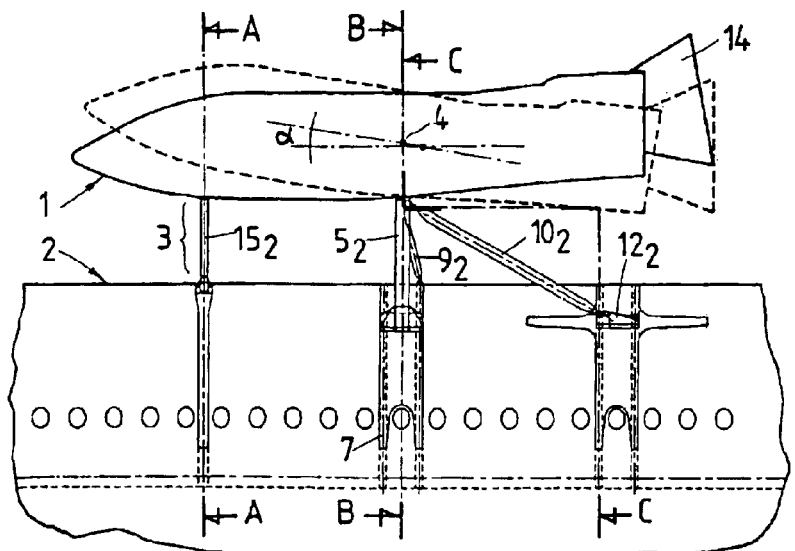
FIG. 1 is a partial diagrammatic view in elevation of a combination according to the present invention.

FIG. 1 of the appended drawings shows the VEHRA vehicle 1 mounted on the back of a large aircraft 2 on a support structure 3.

Figure 2:
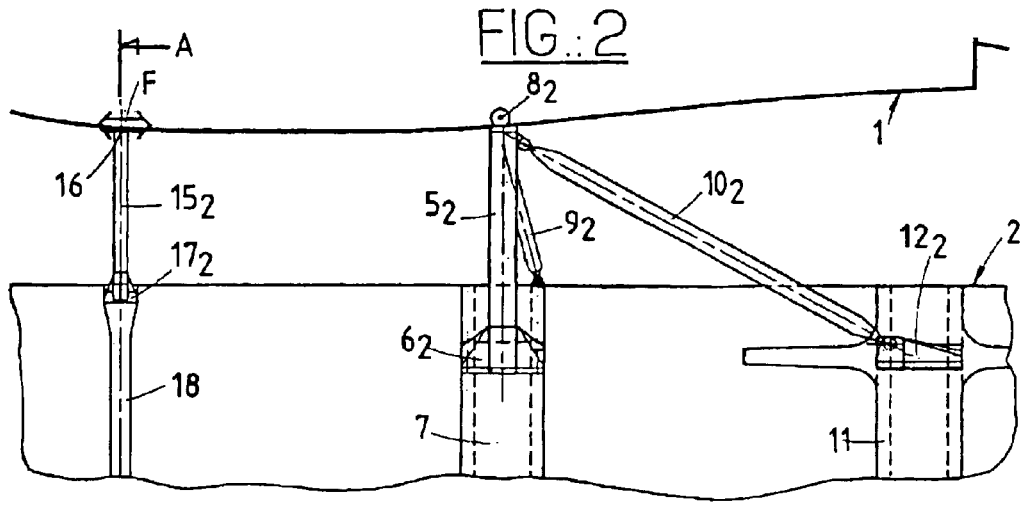
FIG. 2 is a detailed view of the structure of the support for the vehicle on the aircraft in the FIG. 1 combination.
Figures 3A, 3B, 3C:
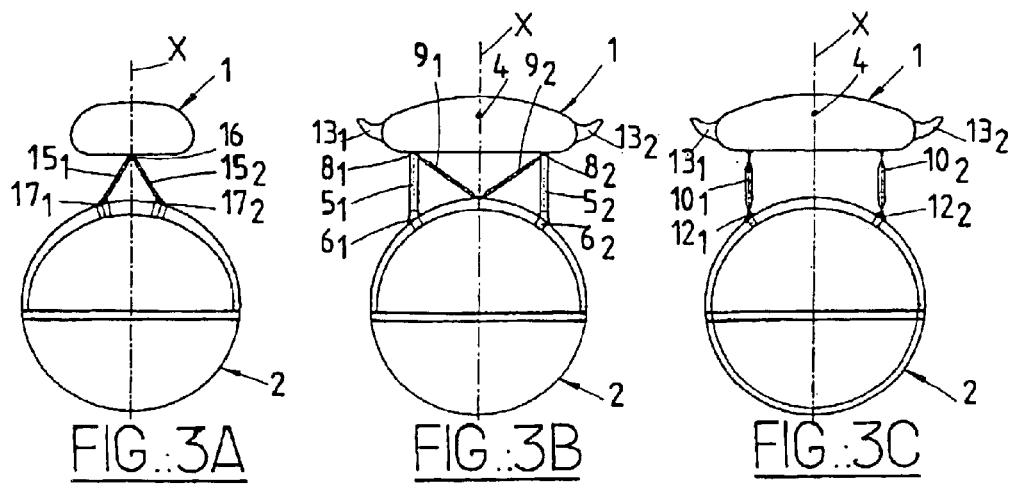
FIGS. 3A, 3B and 3C are views in section of the FIG. 1 combination taken along the respective section lines A, B and C in that figure.

FIG. 2 and the cross sectional views of FIGS. 3A to 3C show that the support structure 3 comprises, substantially in line with the center of mass 4 of the vehicle 1, two parallel beams $5_1$, $5_2$ disposed symmetrically with respect to the axial plane of symmetry X of the combination between respective fixtures $6_1$, $6_2$ fixed to a central reinforcing member 7 of the aircraft and respective coaxial pivots $8_1$, $8_2$, defining articulation means about which the vehicle 1 is able to tilt, as explained below.

Pairs of struts $9_1$, $9_2$ (see FIG. 3B) and $10_1$, $10_2$ (see FIG. 3C) brace the beams $5_1$, $5_2$. As shown, the struts $9_1$, $9_2$ are installed in a V-shaped configuration between the pivots $8_1$, $8_2$ and the reinforcing member 7 and the struts $10_1$, $10_2$ are installed, parallel to the plane X of axial symmetry of the combination, between the respective pivots $8_1$, $8_2$ and a rear reinforcing member 11 of the aircraft, equipped with respective fixtures $12_1$, $12_2$ serving as bearing points for the above struts.

Incidentally, it can be seen in FIGS. 3B and 3C that the vehicle 1 is equipped with fixed ailerons $13_1$, $13_2$ and FIG.

1 shows that the vehicle is further equipped with a rocket engine 14, for the purposes of the autonomous flight of the vehicle, the ailerons and the engine being described in more detail in the article previously cited. The vehicle 1 also has aerodynamic control surfaces (not shown).

To the front of its center of mass 4, the vehicle 1 is supported by a pair of links $15_1$, $15_2$, disposed in an inverted V-shaped configuration, as shown in FIG. 3A, between a common sliding bearing point 16 disposed in the axial plane X of the vehicle and two fixtures $17_1$, $17_2$ symmetrically disposed on a reinforcing member 18 of the aircraft.

According to one feature of the present invention, the links $15_1$, $15_2$ are of adjustable length. Clearly by varying the length of these links, it is possible to tilt the vehicle on its pivots $8_1$, $8_2$, thereby varying the angle of incidence $\alpha$ of the vehicle, as shown in chain-dotted outline in FIG. 1, the angle $\alpha$ being measured relative to the direction of the longitudinal axis of the aircraft. Diverse application of the means for adjusting the angle of incidence of the vehicle are described hereinafter.

The links $15_1$, $15_2$ could consist of screw jacks, and more specifically of recirculating ball screw jacks. This is merely an illustrative example of such means and is not limiting on the invention.

The sliding bearing point 16 is advantageously coupled mechanically to means (not shown) for moving it in the direction of the double-headed arrow F (see FIG. 2) to maintain the links $15_1$, $15_2$ in the transverse plane defined by the line A when the length of the links is modified. This avoids subjecting the links to torques caused by overhang of the vehicle on the aircraft.

The means for evaluating the safety of a phase of separation of the vehicle and the aircraft are described next with reference to FIG. 4. This separation is advantageously obtained by activating pyrotechnic means (not shown) disposed between the vehicle and the support structure 3 in the vicinity of the bearing point 16 and the pivots $8_1$, $8_2$.

This figure shows that the evaluation means include a computer 20 receiving commands 21 from the crew of the aircraft 2 and selectively transmitting instructions 22 to activate the pyrotechnic separation means and instructions 23 controlling the length of the front links $15_1$, $15_2$ to adjust the angle of incidence $\alpha$.

According to the invention, the computer further receives physical measurement data from measuring means 24, 25 and 26.

The means 24 comprise means for measuring "inertial" data relating to the vehicle/aircraft combination, such as, in particular, a roll angle $\phi$, a trim $\theta$, a bearing $\psi$ and three components $J_x$, $J_y$, $J_z$ of the acceleration of the combination.

The means 25 comprise means for measuring "aerodynamic" data: angle of incidence of the aircraft, static and dynamic pressure on the aircraft and the vehicle.

The means 26 comprise means for measuring forces exerted on the diverse elements of the support structure, in particular the links, beams and struts.

The combination according to the invention functions in the following manner. The aircraft 2 takes off from the ground with the VEHRA vehicle fixed to its back by the support structure 3 and climbs to a predetermined altitude, for example 10 km. The vehicle 1 must then be detached from the aircraft to continue on its own, carrying an onboard payload, such as a satellite, to be placed in low Earth orbit, after which the vehicle has to return to the Earth in hypersonic flight, via the atmosphere, to land under automatic control in order to be used again subsequently, as mentioned above.

In a predetermined time window, the crew of the aircraft must send activation instructions 22 to the pyrotechnic separation means to initiate the separation of the vehicle and the aircraft. In preparation for this delicate flight phase, the computer 20 continuously monitors changes in the data delivered by the measuring means 24, 25 and 26, to evaluate the safety of the impending execution of this flight phase. For example, this monitoring can consist in verifying that each measured value remains within a range compatible with the stated objective, namely safe separation of the vehicle and the aircraft, on activation of the pyrotechnic means.

To this end, the computer 20 also contributes to placing the vehicle/aircraft combination in a separation condition by adjusting the aerodynamic conditions of the flight, as measured by the means 25, by acting on the angle of incidence $\alpha$ of the vehicle by sending an appropriate command 23 to the front links $15_1$, $15_2$ to set the angle $\alpha$ to a value such that the combination is in a condition to effect separation safely.

It is therefore certain that this instruction will be given only when the aerodynamic forces on the vehicle are sufficient for the vehicle 1 to move away from the aircraft 2, avoiding any drift of the aircraft.

If the conditions for separation are satisfied during the predetermined time window for effecting separation, the computer 20 advises the crew of this and the crew is then authorized to send an instruction to activate the pyrotechnic separation means.

Otherwise, the computer 20 prohibits the sending of this instruction, which passes through the computer, as shown in FIG. 4.

If this prohibition continues to the end of the time window allowed for the separation, the vehicle/aircraft combination returns to the ground. During the return flight, the computer 20 can continue to operate on the angle of incidence a of the vehicle to optimize the aerodynamic conditions of the return flight, for example by reducing the drag of the combination to save fuel.

The same would apply in the event of aborting the launch because of unfaborable atmospheric conditions or technical problems.

Similarly, controlling the angle $\alpha$ optimizes the flight of the combination from its departure aerodrome to the altitude at which the vehicle must be launched on its own into space or when transporting the VEHRA vehicle to another aerodrome for maintenance, payload integration, etc. operations.

It is now clear that the invention makes the delicate separation phase that is involved in a space launch of the type described in the preamble to this description more reliable.

The separation phase is typically effected at an altitude of 10 km and at a speed of Mach 0.7. Redundant pyrotechnic means are used to increase further the safety of the operation. After separation, the released vehicle moves away from the carrier aircraft with its aerodynamic controls locked and at an angle of incidence from 15 to 20°.

As soon as a predetermined safe distance separates the vehicle 1 from the aircraft 2, the aerodynamic controls of the vehicle are activated, followed by its propulsion engine 14, after a few seconds of unpowered flight.

The incorporation into the support structure for the VEHRA vehicle of means for adjusting its angle of incidence clearly contributes to achieving the stated objective of making separation more reliable whilst having various other advantages during other flight phases, prior to launch or subsequent to aborting a launch.

Of course, the invention is not limited to the embodiment described and shown, which is provided by way of example only. Thus the composite combination according to the invention can include a support structure equipped with means for adjusting the angle of incidence of the vehicle that are not associated with means for authorizing or prohibiting activation of means for separation of the vehicle and the aircraft.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

There is claimed:

1. A composite combination for launching a payload into space, comprising:
   a hypersonic vehicle carrying said payload and designed to take off from the ground on top of an aircraft and then to separate from said aircraft and independently propel said payload toward an assigned trajectory;
   structure for supporting said vehicle on said aircraft, said support structure including means for adjusting an angle of incidence of said vehicle relative to said aircraft at any time during flight including during a phase of separation;
   means for separating said vehicle from said aircraft;
   means for measuring physical data operative in evaluation of the safety of a phase of separation of said vehicle and said aircraft, said measuring means delivering measured inertial and aerodynamic data associated with behavior of said composite combination; and
   means for evaluating said safety of said phase to authorize or prohibit activation of said separation means.

2. The combination according to claim 1, wherein said measuring means also delivers measured values of forces applied to said support structure.

3. The combination according to claim 1, wherein said adjustment means include a pair of variable length links forming part of said support structure and disposed between said vehicle and said aircraft forward of a center of mass of the vehicle to cause said vehicle to tilt about an axis perpendicular to a longitudinal plane of symmetry of said vehicle and situated in a transverse plane close to said center of mass.

4. The combination according to claim 3, wherein said axis is that of articulation elements installed between said vehicle and beams forming part of said support structure and disposed substantially in line with said center of mass.

5. The combination according to claim 4, wherein said support structure includes struts for distributing forces exerted on said beams.

6. The combination according to claim 3, wherein said support structure includes a sliding bearing point for maintaining said links in a plane transverse to a longitudinal axis of said aircraft regardless of the angle of incidence of said vehicle.

7. The combination according to claim 1, wherein said evaluation means includes a computer receiving said measured physical data and instructions from the crew of said aircraft and generating instructions for controlling said separation means and said means for adjusting the angle of incidence of said vehicle.

8. The combination according to claim 1, wherein said separation means includes a pyrotechnic element disposed between said vehicle and said support structure.

9. A composite combination for launching a payload into space, comprising:
   a hypersonic vehicle carrying said payload and designed to take off from the ground on top of an aircraft and then to separate from said aircraft and independently propel said payload toward an assigned trajectory;
   a support structure for supporting said vehicle on the back of said aircraft, said support structure including an adjustment mechanism for adjusting an angle of incidence of said vehicle relative to said aircraft at any time during flight including during a phase of separation of said vehicle and said aircraft;
   a separation mechanism for separating said vehicle from said aircraft;
   measuring elements for collecting physical data operative in evaluation of the safety of the phase of separation of said vehicle and said aircraft, said measuring elements delivering measured inertial and aerodynamic data associated with behavior of said composite combination; and
   a computer for evaluating said measured inertial and aerodynamic data to determine the safety of said separation phase to authorize or prohibit activation of said separation mechanism.

10. The combination according to claim 9, wherein said measuring elements also deliver measured values of forces applied to said support structure.

11. The combination according to claim 9, wherein said adjustment mechanism includes a pair of variable length links forming part of said support structure and disposed between said vehicle and said aircraft forward of a center of mass of the vehicle to cause said vehicle to tilt about an axis perpendicular to a longitudinal plane of symmetry of said vehicle and situated in a transverse plane close to said center of mass.

12. The combination according to claim 11, wherein said axis is that of articulation elements installed between said vehicle and a pair of beams forming part of said support structure and disposed substantially in line with said center of mass.

13. The combination according to claim 12, wherein said support structure includes struts for distributing forces exerted on said pair of beams.

14. The combination according to claim 11, wherein said support structure includes a sliding bearing point for maintaining said links in a plane transverse to a longitudinal axis of said aircraft regardless of the angle of incidence of said vehicle.

15. The combination according to claim 9, wherein said computer receives said measured physical data and instructions from the crew of said aircraft and generates instructions for controlling said separation mechanism and said adjustment mechanism to adjust the angle of incidence of said vehicle.

16. The combination according to claim 9, wherein said separation mechanism includes a pyrotechnic element disposed between said vehicle and said support structure.

* * * * *

UNITED STATES PATENT AND TRADEMARK OFFICE
CERTIFICATE OF CORRECTION

PATENT NO. : 6,926,226 B2
DATED : August 9, 2005
INVENTOR(S) : Laurent Claude Jean-Louis Gathier It is certified that error appears in the above-identified patent and that said Letters Patent is hereby corrected as shown below:

Title page,
Item [73], Assignee, change "Dassualt Aviation, Paris (FR)" to -- Dassault Aviation, Paris (FR) --.

Signed and Sealed this

Seventh Day of February, 2006

JON W. DUDAS
*Director of the United States Patent and Trademark Office*